W. P. GOOLMAN.
Platform Scales.

No. 67,871.  Patented Aug. 20, 1867.

WITNESSES:

INVENTOR:

United States Patent Office.

W. P. GOOLMAN, OF DUBLIN, INDIANA, ASSIGNOR TO DAVIS, LAWRENCE AND CO., OF SAME PLACE.

*Letters Patent No. 67,871, dated August 20, 1867.*

IMPROVED PLATFORM-SCALE.

*The Schedule referred to in these Letters Patent and making part of the same.*

TO ALL WHOM IT MAY CONCERN:

Be it known that I, W. P. GOOLMAN, of Dublin, in the county of Wayne, and State of Indiana, have invented certain new and useful improvements in Platform-Scales; and I do hereby declare that the following is a full, clear, and exact description of the same, reference being had to the annexed drawings, making part of this specification, in which—

Figure 1:
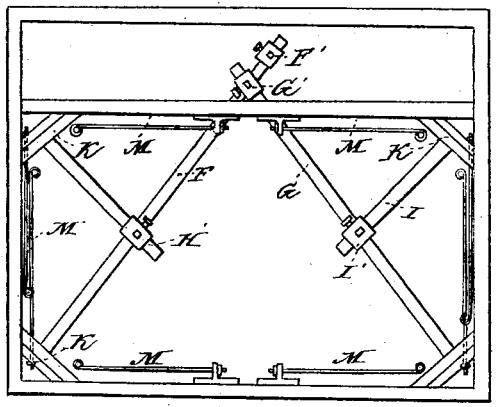
Figure 2:
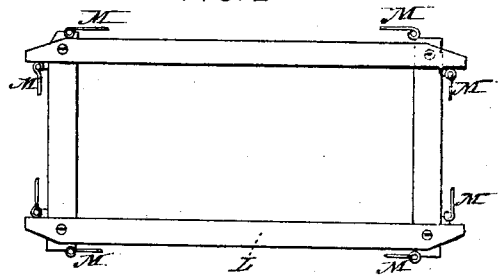
Figures 3, 4, 5:
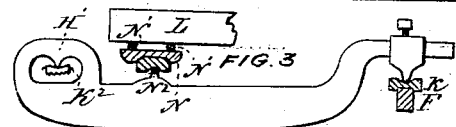
Figure 6:
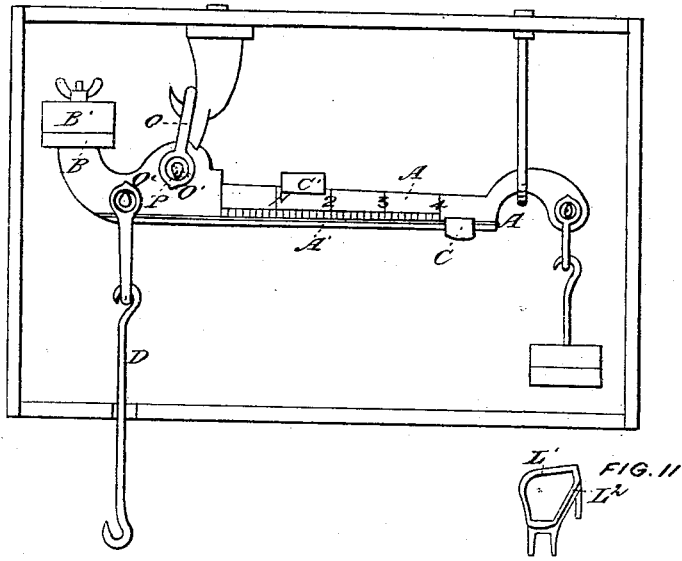
Figures 7, 8, 9, 10, 11, 12:
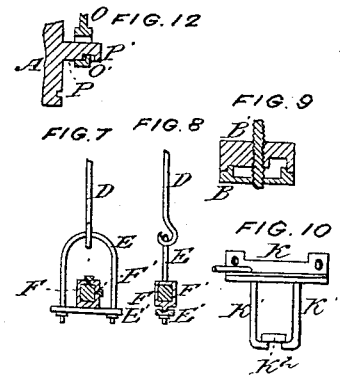

Figure 1 is a plan of the platform-levers.
Figure 2 is a plan of the platform-frame.
Figure 3 is a side elevation and section, showing the mode of suspending the levers.
Figure 4 is a plan of the ball-blocks.
Figure 5 is a bottom view of the same.
Figure 6 is an elevation of the scale-beam.
Figure 7 is an elevation of the stirrup.
Figure 8 is an end view and section of the same.
Figure 9 is a section of the counterpoise.
Figure 10 is an elevation of the corner hangers.
Figure 11 a perspective view of the corner plates.
Figure 12 a longitudinal section of one of the shears and pivot.

The same letters are employed in all the figures when indicating the same parts.

As my improvements are intended to apply to ordinary platform-scales, it will not be necessary to describe minutely such parts as are in common use, and familiar to all persons skilled in the art of making scales. The case illustrated in the drawings is that of a platform-scale such as is used for weighing stock and other heavy draughts.

A is the steelyard-beam. B is the counterpoise, which must be so constructed as to have as much weight on one side of the pivot, on which the beam is suspended above the level thereof, as there is on the other side of the pivot below the said level. In practice it is necessary that this counterpoise should be adjustable. To this end I construct it in two parts, viz, the cup B and the cap B'. In adjusting the beam this cup may be filled with lead or other suitable substance, until the proper and prompt action of the beam is secured. This adjustment should not be confounded with the ordinary adjustment of the equilibrium of parts. The cap B' has part of its metal cut away on one side so as to make it heavier on one side than on the other, so that by turning it on its axis when in place the weight may be brought nearer to or removed from the fulcrum of the beam for the purpose of balancing the scale before weighing the draught. A groove is cut in the lower side of the beam, or flanges extended thereon, to attach the sliding poise-weight C, which is so proportioned in relation to the weight C', that while the latter shall indicate, say ten pounds to the notch, the former shall indicate, say one pound. These fractional relations may, of course, be varied according to the requirement of the scale. The beam is connected with the platform levers by the rod D, which supports the end of the lever F, resting upon the stirrup E. The platform lever F rests upon the bottom E' of the stirrup, being sustained upon a knife-edged bearing on the lower side of the adjustable collar F', fastened to the lever by set-screws. F and G are the long levers of the platform. The end of the lever G rests in the lever F, near the point of its attachment to the rod D. It rests upon a knife-edged bearing on the bottom of the adjustable collar, which rests upon the edge of a similar sharp bearing upon the upper face of the lever F, the two bearing edges crossing one another at or nearly at right angles. H and I are the short levers which rest respectively at one end upon the levers F and G near their middle. They rest upon the knife-edged bearing upon the adjustable collars H' I'. They do not bear directly upon the upper edges of the bearings upon the upper faces of the long levers, but upon rocker-blocks, K, which are detached blocks with a recess in the upper face of each to receive the edges H' and I', and another recess in their lower faces, severally, to receive the edges of the bearings upon the upper faces of the long levers F and G. The fixed ends of the four levers are suspended upon the corner hangers K, which are cast pieces fitted for attachment in the angles of the framework enclosing the platform, having two hooked hangers, K¹, facing each other, and supporting the block K². The lower face of the ends of these blocks, and the upper face of the hooks of the hanger $K^1$ are notched to fit one another, and for the purpose of permitting the lever to be adjusted in the direction of its length, and after it is so adjusted to hold the blocks firmly in position to prevent the levers from slipping endwise on their bearings. The levers have an eye with a knife-edged point, as shown at $H'$, fig. 3, which rests upon the block $K^2$. The platform rests upon a rectangular frame, L, having iron plates under its four corners $L^1$, constructed with projections $L^2$, to receive the stay-rods M, which are attached at one end to the exterior framework, and at the other to the corner plates $L^1$, so as to prevent any side play in the platform, but so as not to prevent or impede its proper vertical action in weighing. The lower flat face of the frame corners $L^1$ (called check-blocks) rests upon small balls supported upon the ball-block N, which has indentations in its upper face to receive the balls, and rests upon a rocker-block, $N^2$, which is balanced upon a knife-edged projection from the upper face of the levers, near the end at which they are suspended. The shears O are suspended from (or suspend) the pivots P. To prevent the friction of the shears against the sides of the beam A they are held in place by cutting a notch in the pivot at $P'$. The sides of the notch are inclined so as to leave a sharp point on each side to bear against a tapering fin passing across an eye in the ends of the shears at $O'$. The objects of the foregoing construction and arrangement of the parts are to avoid friction and provide for the convenient adjustment of the parts, and by suspending the long levers so that one shall rest upon the other, to prevent any effect impairing the accuracy of the scales ensuing from the unequal loading of the ends of the platform.

What I claim as my invention, and desire to secure by Letters Patent, is—

1. The balance-weight upon the end of the steelyard-beam above the level of the fulcrum, when constructed with a cup B (for receiving such weight as may be necessary in the adjustment of the steelyard-beam,) and cap $B'$, substantially as described.

2. The combination of the cup B and cap $B'$, when the latter is constructed with its sides of unequal weight, substantially as and for the purpose set forth.

3. The corner irons K, supporting the hooked and notched hangers $K^1$, in combination with the notched blocks $K^2$, supporting the platform-levers, substantially as set forth.

4. The levers F, G, H, and I, constructed with an eye in the end and knife-edged bearing $H'$, in combination with the rocker-blocks $K^2$ on which they are suspended, substantially as described.

5. The combination of the rocker-blocks $N^2$, ball-blocks N, balls $N^1$, and check-blocks $L^1$, substantially as set forth.

6. The combination of the frame L, check-blocks $L^1$, and rods M, substantially as and for the purpose set forth.

7. The combination of the shears O with fins $O'$, and the notched pivots P, substantially as and for the purpose set forth.

In testimony whereof I have signed my name to this specification in the presence of two subscribing witnesses.

W. P. GOOLMAN.

Witnesses:
    EDM. F. BROWN,
    D. P. HOLLOWAY.